United States Patent [19]
Ikebe et al.

[11] Patent Number: 5,239,963
[45] Date of Patent: Aug. 31, 1993

[54] IGNITION TIMING CONTROL SYSTEM FOR INTERNAL COMBUSTION ENGINES

[75] Inventors: Hidehito Ikebe; Shusuke Akazaki, both of Wako, Japan

[73] Assignee: Honda Giken Kogyo Kabushiki Kaisha, Tokyo, Japan

[21] Appl. No.: 975,384

[22] Filed: Nov. 12, 1992

[30] Foreign Application Priority Data

Nov. 13, 1991 [JP] Japan .................. 3-325231

[51] Int. Cl.$^5$ .............................................. F02P 5/06
[52] U.S. Cl. .................................................. 123/419
[58] Field of Search ............... 123/419, 417, 422, 478, 123/480, 936; 364/431.08, 431.05

[56]         References Cited
         U.S. PATENT DOCUMENTS

| | | | |
|---|---|---|---|
| 4,887,573 | 12/1989 | Fujiwara et al. | 123/422 |
| 4,931,011 | 11/1990 | Nanyoshi et al. | 123/436 |
| 4,977,508 | 12/1990 | Tanaka et al. | 364/431.08 |
| 5,040,509 | 8/1991 | Nakaki et al. | 123/422 |
| 5,050,554 | 9/1991 | Lebikawa | 123/419 |
| 5,156,128 | 10/1992 | Nakagawa | 123/436 |
| 5,168,853 | 12/1992 | Kittleson et al. | 123/419 |

FOREIGN PATENT DOCUMENTS 0339602 11/1989 European Pat. Off. ............ 123/422

63-36024 2/1988 Japan ........................... 123/419

OTHER PUBLICATIONS

European Search Report.
Patent Abstract of JP A-61-16136 in English.

Primary Examiner—Raymond A. Nelli
Attorney, Agent, or Firm—Lyon & Lyon

[57]         ABSTRACT

An ignition timing control system controls ignition timing of spark plugs of an internal combustion engine associated with a plurality of changeover devices, changeover of an operative state of each of which has influence upon output torque of the engine. Operating conditions of the engine are detected. A basic ignition timing advance value is calculated based on results of detection of the operating conditions of the engine. A changeover of the operative state of each of the changeover devices is detected. A correction value for correcting the basic ignition timing advance value for suppressing the engine torque is calculated, in response to results of detection of the changeover of the operative state of each of the changeover devices. The largest one of a plurality of the correction values calculated is selected to a final correction value to be used for correcting the basic ignition timing advance value, when changeovers of the operative states of at least two of the changeover devices are detected substantially at the same time.

19 Claims, 13 Drawing Sheets

IGNITION TIMING CONTROL SYSTEM FOR INTERNAL COMBUSTION ENGINES

BACKGROUND OF THE INVENTION

1. Field of the Invention

This invention relates to an ignition timing control system for internal combustion engines, and more particularly to an ignition timing control system of this kind which is adapted to control the ignition timing of an internal combustion engine provided with a plurality of changeover devices having influence upon the output torque of the engine.

2. Prior Art

Conventionally, an internal combustion engine is known, which is associated with changeover devices, such as a transmission the reduction ratio of which can be changed to different ratios, and a valve timing selector device for changing the valve timing of intake valves of the engine, i.e. valve opening duration and/or valve lift thereof.

In an internal combustion engine provided with such changeover devices, there is a problem that a torque shock can arise when such a changeover device effects changeover of the operative state thereof. To suppress the torque shock, it has already been proposed to employ a technique of retarding the ignition timing, e.g. by Japanese Provisional Patent Publication (Kokai) No. 63-36024.

However, when more than one changeover device have almost simultaneously effected changeover of the operative states thereof, a final correction value which is the sum of a plurality of correction values for retarding the ignition timing calculated in response to changeover of the operative states of the respective changeover devices, is virtually applied to retard the ignition timing. As a result, the ignition timing can be retarded so excessively that a misfire may take place to degrade the driveability of the engine.

Further, the ignition timing can be also retarded to reduce a torque shock when the engine is accelerated from a low speed. If a correction value for retarding the ignition timing is added to the above-mentioned sum of the correction values, the ignition timing is further retarded, which makes the engine further liable to the above-mentioned inconveniences.

SUMMARY OF THE INVENTION

It is the object of the invention to provide an ignition timing control system for an internal combustion engine which is capable of avoiding occurrence of a misfire and hence degradation in the driveability even if a plurality of changeover devices having influence upon the output torque of the engine have effected changeover of the operative states thereof.

To attain the above object, the invention provides an ignition timing control system for an internal combustion engine having spark plugs, the system controlling ignition timing of the spark plugs, and a plurality of changeover devices, changeover of an operative state of each of the changeover devices having influence upon output torque of the engine.

The ignition timing control system according to the invention is characterized by comprising:

operating condition-detecting means for detecting operating conditions of the engine;

ignition timing advance value-calculating means for calculating a basic ignition timing advance value based on results of detection by the operating condition-detecting means;

changeover-detecting means for detecting a changeover of the operative state of each of the changeover devices;

correction value-calculating means for calculating a correction value for correcting the basic ignition timing advance value for suppressing the engine torque, in response to results of detection of the changeover of the operative state of the each of the changeover devices by the changeover detecting means; and correction value-selecting means for selecting the largest one of a plurality of the correction values calculated by the correction value-calculating means to a final correction value to be used for correcting the basic ignition timing advance value, when the changeover-detecting means has detected changeovers of the operative states of at least two of the changeover devices substantially at the same time.

Preferably, the operating conditions of the engine include at least load on the engine and a rotational speed of the engine.

For example, the changeover devices include value timing-changing means for changing a manner of opening intake valves of the engine, and a transmission being capable of changing a reduction ratio thereof to a plurality of ratios, the changeover-detecting means including first changeover-detecting means for detecting a changeover of an operative state of the valve timing-changing means, and second changeover-detecting means for detecting a changeover of the reduction ratio of the transmission, the correction value-correcting means including first correction value-calculating means for calculating a first correction value for correcting the basic ignition timing advance value in response to results of detection by the first changeover-detecting means, and second correction value-calculating means for calculating a second correction value for correcting the basic ignition timing advance value in response to results of detection by the second changeover-detecting means, the correction value-selecting means selecting the largest one of the first and second correction values calculated by the first and second correction value-calculating means to the final correction value to be used for correcting the basic ignition timing advance value, when the first and second changeover-detecting means have detected changeovers of the operative states of the valve timing-changing means and the transmission substantially at the same time.

More preferably, the changeover-detecting means includes third changeover-detecting means for detecting a changeover of an operative state of the engine to a predetermined accelerating condition, the correction value-correcting means including third correction value-calculating means for calculating a third correction value for correcting the basic ignition timing advance value in response to results of detection by the third changeover-detecting means, the correction value-selecting means selecting the largest one of the first to third correction values calculated by the first to third correction value-calculating means to the final correction value to be used for correcting the basic ignition timing advance value, when at least two of the first to third changeover-detecting means have detected changeovers of the operative states of corresponding ones of the valve timing-changing means, the transmission and the engine substantially at the same time.

Further preferably, the operating condition-detecting means includes coolant temperature-detecting means for detecting a temperature of a coolant circulating through the engine, and the calculation of the first correction value by the first correction value-calculating means is effected upon the lapse of a first predetermined time period after the first changeover-detecting means has detected a changeover of the operative state of the valve timing-changing means, the first predetermined time period being set based upon the temperature of the coolant detected by the coolant temperature-detecting means.

Preferably, the calculation of the second correction value by the second correction value-calculating means is effected upon the lapse of a second predetermined time period after the second changeover-detecting means has detected a changeover of the reduction ratio of the transmission, the second predetermined time period being set based upon the rotational speed of the engine and the manner of changeover in the reduction ratio of the transmission detected by the second changeover-detecting means.

Also preferably, the first correction value-calculating means calculates the first correction value based upon the load on the engine detected by the operating condition-detecting means.

Preferably, the second correction value-correcting means calculates the second correction value based upon the rotational speed of the engine detected by the operating condition-detecting means and a manner of changeover of the reduction ratio of the transmission detected by the second changeover-detecting means.

The above and other objects, features, and advantages of the invention will become more apparent from the ensuing detailed description taken in conjunction with the accompanying drawings.

DETAILED DESCRIPTION

The invention will be described in detail with reference to the drawings showing an embodiment thereof.

Figure 1:
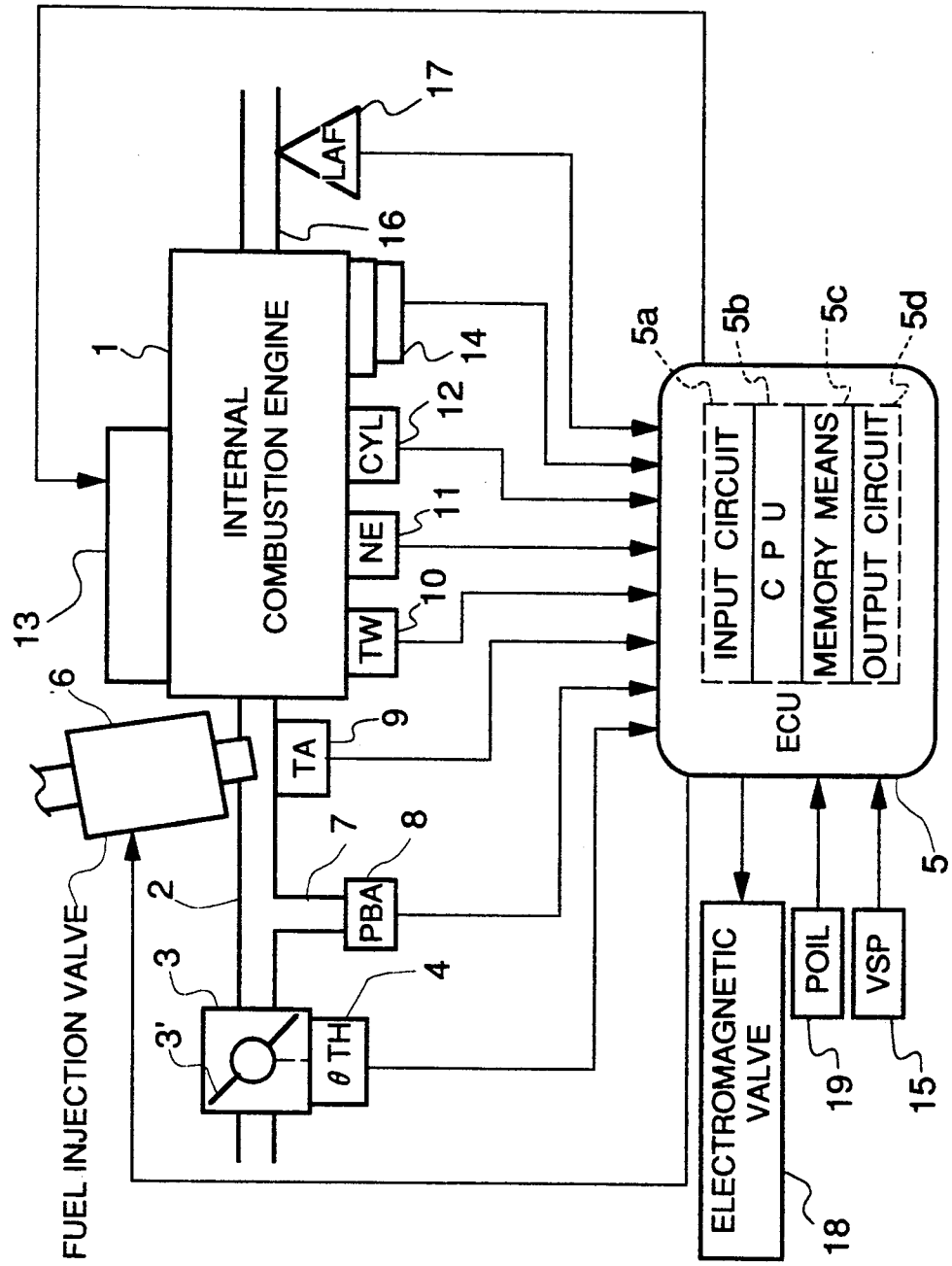
FIG. 1 is a schematic diagram showing the whole arrangement of an ignition timing control system for an internal combustion engine, according to an embodiment of the invention.

Referring first to FIG. 1, there is shown the whole arrangement of an ignition timing control system for an internal combustion engine, according to an embodiment of the invention.

In the figure, reference numeral 1 designates a DOHC straight type four cylinder engine, each cylinder being provided with a pair of intake valves and a pair of exhaust valves, not shown. This engine 1 is arranged such that the valve timing of the intake valves and exhaust valves can be selected between a high speed valve timing (high-speed V/T) suitable for engine operation in a high engine speed region and a low speed valve timing (low-speed V/T) suitable for engine operation in a low engine speed region.

In an intake pipe 2 of the engine 1, there is arranged a throttle body 3 accommodating a throttle body 3' therein. A throttle valve opening ($\theta$TH) sensor 4 is connected to the throttle valve 3' for generating an electric signal indicative of the sensed throttle valve opening and supplying same to an electronic control unit (hereinafter referred to as "the ECU") 5.

Fuel injection valves 6 are each provided for each cylinder and arranged in the intake pipe 2 between the engine 1 and the throttle valve 3, and at a location slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is mounted at an end of a branch conduit 7 branching off from the intake pipe 2 at a location immediately downstream of the throttle valve 3', for sensing absolute pressure (PBA) within the intake pipe 2, and is electrically connected to the ECU 5 for generating an electric signal indicative of the sensed absolute pressure PBA and supplying same to the ECU 5.

An intake air temperature (TA) sensor 9 is inserted into the intake pipe 2 at a location downstream of the intake pipe absolute pressure sensor 8 for supplying an electric signal indicative of the sensed intake air temperature TA to the ECU 5.

An engine coolant temperature (TW) sensor 10, which may be formed of a thermistor or the like, is mounted in the coolant-filled cylinder block of the engine 1 filled with coolant for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 31, neither of which is shown. The NE sensor 11 generates a pulse as a TDC signal pulse at each of predetermined crank angles whenever the crankshaft rotates through 180 degrees, while the CYL sensor 12 generates a pulse at a predetermined crank angle of a particular cylinder of the engine, both of the pulses being supplied to the ECU 5.

A spark plug 13 provided for each cylinder of the engine 1 is electrically connected to the ECU 5 to have ignition timing thereof controlled by a signal supplied therefrom.

A transmission 14 which is capable of changing the reduction ratio e.g. between seven ratios is interposed between the engine 1 and driving wheels, not shown, to allow the driving wheels to be driven by the engine 1 at the selected reduction ratio.

A vehicle speed sensor (VSP) sensor 15 is provided at one of trailing wheels, not shown, for detecting the travelling speed VSP of the vehicle to supply an electric signal indicative of the sensed vehicle speed to the ECU 5.

A linear air-fuel ratio sensor (hereinafter referred to as "the LAF sensor") 17 is arranged across an exhaust pipe 16 of the engine 1 for detecting the concentration of oxygen present in exhaust gases emitted from the engine to supply an electric signal indicative of the sensed oxygen concentration to the ECU 5. The output from the LAF sensor 17 is approximately proportional to the oxygen concentration.

Connected to the output of the ECU 5 is an electromagnetic valve 18 which has opening and closing operation thereof controlled by a signal from the ECU 5 for controlling changeover of the valve timing of the intake and exhaust valves. The electromagnetic valve 18 effects changeover of hydraulic pressure prevailing within a valve timing changeover mechanism, not shown, between high and low levels, the valve timing changeover mechanism being actuated by the selected level of hydraulic pressure to effect changeover of the valve timing between the high-speed V/T and the low-speed V/T. The hydraulic pressure within the changeover mechanism is detected by an oil pressure (POIL) sensor 19, from which an electric signal indicative of the sensed hydraulic pressure POIL is supplied to the ECU 5.

The ECU 5 comprises an input circuit 5a having the functions of shaping the waveforms of input signals from various sensors as mentioned above, shifting the voltage levels of sensor output signals to a predetermined level, converting analog signals from analog-output sensors to digital signals, and so forth, a central processing unit (hereinafter referred to as "the CPU") 5b, memory means 5c formed of a ROM storing various operational programs which are executed by the CPU 5b, and various maps, referred to hereinafter, and a RAM for storing results of calculations therefrom, etc., an output circuit 5d which outputs driving signals to the fuel injection valves 6, the spark plugs 13 and the electromagnetic valve 18, respectively.

The CPU 5b operates in response to the above-mentioned signals from the sensors to determine operating conditions in which the engine 1 is operating, such as an air-fuel ratio feedback control region and open-loop control regions, and calculates, based upon the determined engine operating conditions, the valve opening period or fuel injection period TOUT over which the fuel injection valves 6 are to be opened by the use of the following equation (1) in synchronism with generation of TDC signal pulses and stores the results of calculation into the memory means (RAM) 35c:

$$TOUT = TiM \times KCMDM \times KLAF \times K1 + K2 \quad (1)$$

where TiM represents a basic fuel injection amount determined according to the engine rotational speed NE and the intake pipe absolute pressure PBA. TiM maps are used for determining the value of TiM, which are stored in the memory means 35c (ROM), i.e. a TiML map suitable for the low-speed V/T and a TiMH map suitable for the high-speed V/T.

KCMDM represents a modified desired air-fuel ratio coefficient which is calculated by multiplying a desired air-fuel ratio coefficient KCMD representing an equivalent ratio of a desired air-fuel ratio which is set according to engine operating conditions, by an air density-dependent correction coefficient KETC.

The correction coefficient KETC is intended to apply a prior correction to the fuel injection amount so as to compensate for variation in the supply air-fuel ratio due to the cooling effect produced when fuel is actually injected, and its value is set according to the value of the desired air-fuel ratio coefficient KCMD.

KLAF represents an air-fuel ratio correction coefficient, which is set, during air-fuel ratio feedback control, such that the equivalent ratio of the supply air-fuel ratio detected based on the output voltage from the LAF sensor 17 (hereinafter referred to as "the detected air-fuel ratio coefficient") KACT becomes equal to the desired air-fuel ratio coefficient KCMD, whereas during open loop control it is set to predetermined values suitable for predetermined operating conditions of the engine.

K1 and K2 represent other correction coefficients and correction variables, respectively, which are calculated based on various engine parameter signals to such values depending on engine operating conditions as to optimize characteristics of the engine such as fuel consumption and accelerability.

The CPU 5b of the ECU 5 forms ignition timing advance value-calculating means for calculating a basic ignition timing advance value $\theta$IGM depending on operating conditions of the engine, correction value-calculating means for calculating correction values for correcting the basic ignition timing value so as to suppress a torque shock which can occur when a plurality of changeover devices associated therewith effect changeover of the operative states thereof, respectively, and correction value-selecting means for selecting the largest one of the correction values as an ultimate correction value used for correcting the basic ignition timing advance value $\theta$IGM when two or more of the changeover devices have effected changeover of the operative states thereof almost at the same time.

Next, a manner of ignition timing control executed by the ignition timing control system according to the invention will be described in detail with reference to FIGS. 2 to 15.

Figure 2:
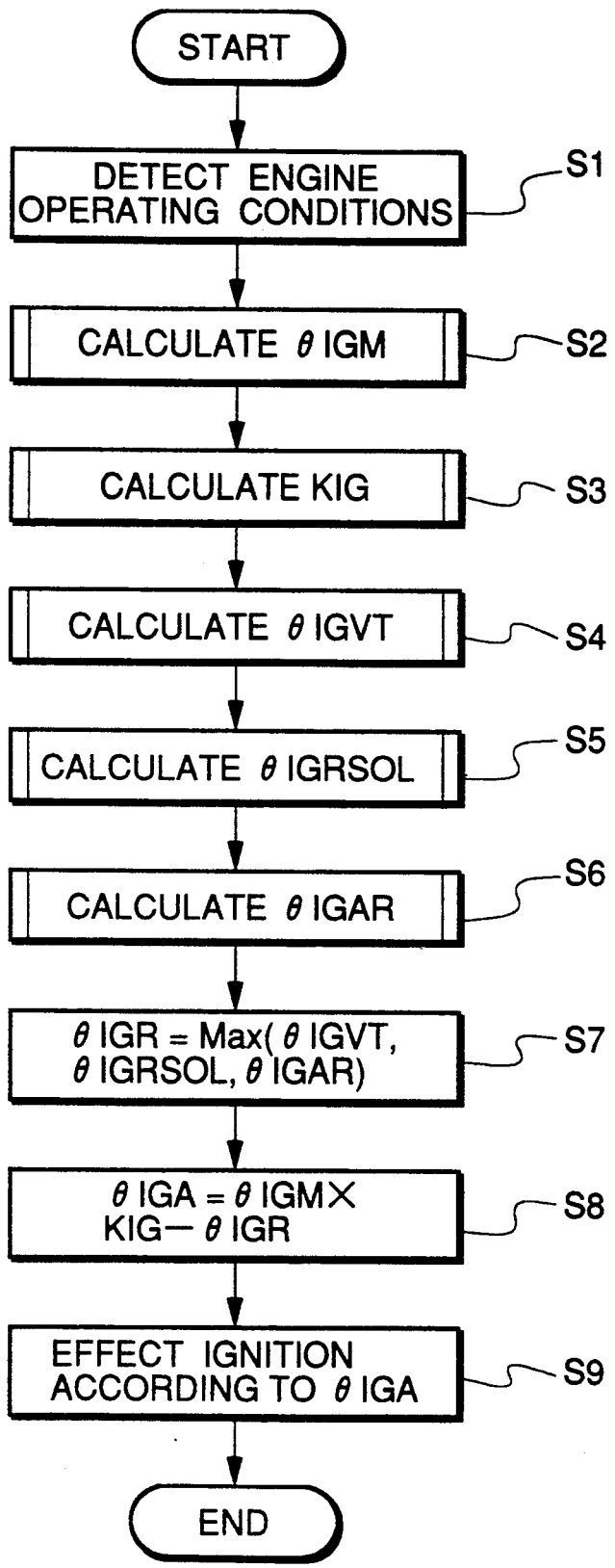
FIG. 2 is a flowchart showing a program for calculating the ignition timing.

FIG. 2 shows a program for calculating an ignition timing advance value, which is executed in synchronism with inputting of each TDC signal pulse to the ECU 5.

First, at a step S1, operating conditions of the engine are detected. More specifically, the engine rotational speed NE, the intake pipe absolute pressure sensor PBA, and the throttle valve opening $\theta$TH are detected based, respectively on outputs from the NE sensor 1, the PBA sensor 8, and the $\theta$TH sensor 4, and the detected values are stored into the memory means.

At a step S2, the basic ignition timing advance value $\theta$IGM is calculated as a function of operating conditions of the engine, e.g. the engine rotational speed NE, and the intake pipe absolute pressure PBA representing load on the engine. In the present embodiment, the basic timing advance value $\theta$IGM is read from an ignition timing map in which optimum values thereof are provided correspondingly to values of the engine rotational speed NE and the intake pipe absolute pressure PBA. In addition, as the ignition timing map, two types, i.e. a θIGML map suitable for low speed valve timing and a θIGMH map suitable for high speed valve timing, are stored in the memory means 5c.

At a step S3, a basic ignition timing correction coefficient KIG is calculated and stored into the memory means 5c. The basic ignition timing correction coefficient KIG is a coefficient for correcting the basic ignition timing advance value θIGM depending on the engine coolant temperature TW, the throttle valve opening θTH, etc., which is set to a predetermined value corresponding to an operating condition in which the engine is operating, determined by these parameters.

At a step S4, a valve timing changeover-dependent correction value (hereinafter referred to as "the V/T changeover correction value") θIGVT for correcting or retarding the ignition timing in response to changeover of the valve timing is calculated and stored into the memory means 5c. Then, at a step S5, a reduction ratio changeover-dependent correction value (hereinafter referred to as "the shift correction value") θIGRSOL for correcting or retarding the ignition timing in response to changing of the reduction ratio of the transmission 14 is calculated and stored into the memory means 5c. Further, at a step S6, an acceleration-dependent correction value (hereinafter referred to as "the acceleration correction value") θIGAR for correcting or retarding the ignition timing when the engine is in a predetermined accelerating condition is calculated and stored into the memory means 5c.

Then, at a step S7, a comparison is made between the V/T changeover correction value θIGVT, the shift correction value θIGRSOL, and the acceleration correction value θIGAR to select the largest one of these correction values and set same to a final ignition timing-retarding correction value θIGR, followed by calculating an ignition timing advance value θIGA by the use of the following equation (2) and storing same into the memory means 5c at a step S8:

$$\theta IGA = \theta IGM \times KIG - \theta IGR \qquad (2).$$

At a step S9, ignition of the spark plug, is effected according to the timing advance value θIGA, followed by terminating the program.

Figure 3:
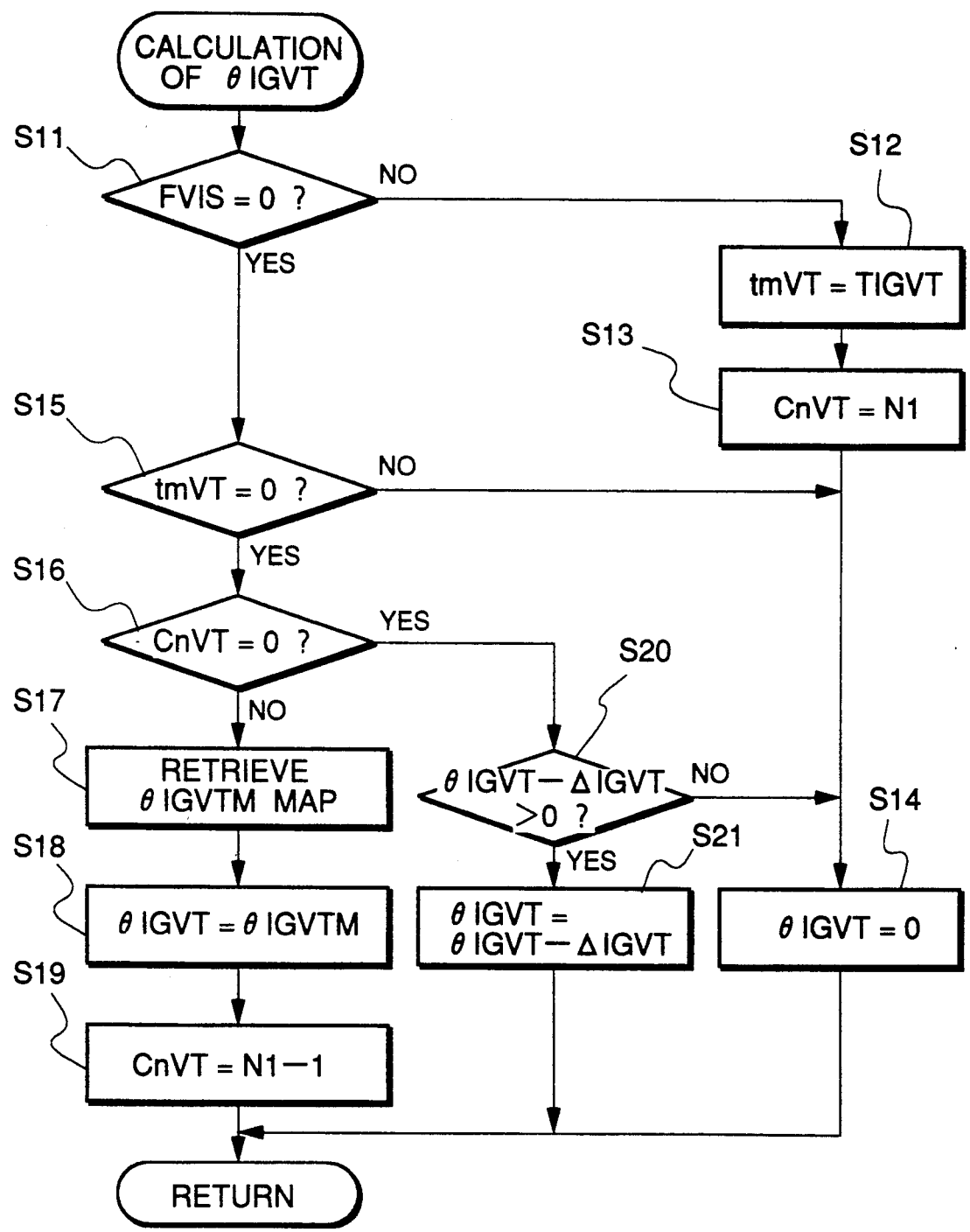
FIG. 3 is a flowchart showing a subroutine for calculating a valve timing (V/T) changeover-dependent correction value $\theta$IGVT.

FIG. 3 shows a subroutine for calculating the V/T changeover correction value θIGVT, which is executed at the step S4 of the main routine of FIG. 2.

Figure 4:
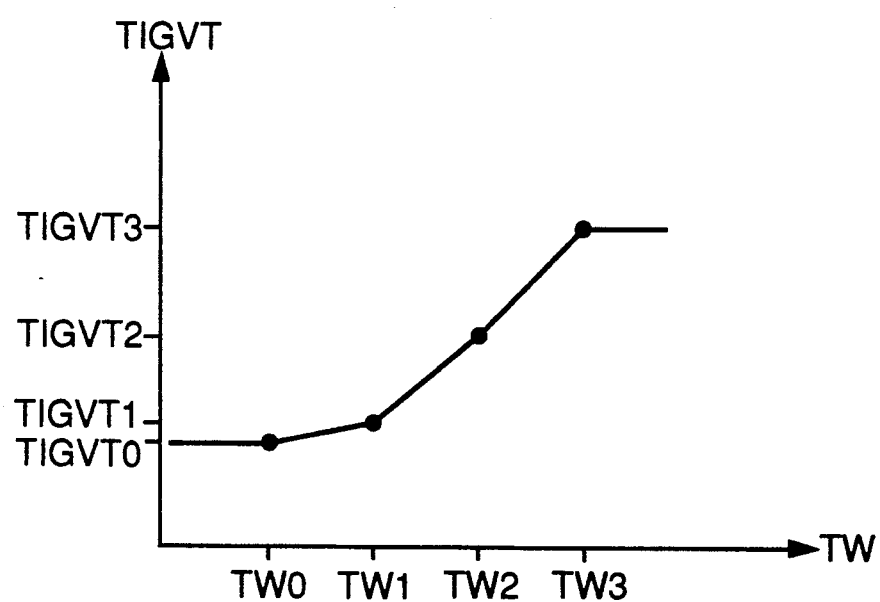
FIG. 4 shows a TIGVT map.

First, at a step S11, it is determined whether or not the high speed V/T is in use. This determination is made by determining whether or not a flag FVIS which is set in another routine, not shown, is equal to "0". If the answer to this question is negative (NO), i.e. if the low speed V/T is in use, a first delay timer tmVT for compensating for a control time lag in changing over the valve timing, which is inherent to the use of hydraulic pressure, is set to a predetermined time period TIGVT and started at a step S12. The predetermined time period TIGVT is retrieved from a tmVT map, or additionally by interpolation, which map is set e.g. as shown in FIG. 4 such that optimum values thereof TIGVT0 to TIGVT3 are provided correspondingly to values of the coolant temperature TW0 to TW3. As is clear from FIG. 4, the predetermined time period TIGVT increases as the engine coolant temperature TW becomes higher.

Then, a first counter CnVT is set to a predetermined value N1 (e.g. 4) at a step S13, thereby setting a time period for using a map value θIGVTM, referred to hereinafter, as the V/T changeover correction value θIGVT, followed by terminating the program without effecting the ignition timing-retarding correction.

If the valve timing is changed over to the high speed V/T in a subsequent loop, the flag FVIS is set to "0", so that the answer to the question of the step S11 becomes affirmative (YES), and hence the program proceeds to a step S15.

At the step S15, it is determined whether or not the count value of the first delay timer tmVT is equal to "0". If the answer to this question is negative (NO), which means that the present loop is within the delaying time period, the program proceeds to the step S14, where the V/T changeover correction value θIGVT is set to "0", followed by terminating the program without effecting the ignition timing-retarding correction. On the other hand, if the answer to the question of the step S15 is affirmative (YES), the program proceeds to a step S16, where it is determined whether or not the count value of the first counter CnVT is equal to "0". Since the answer to this question is negative (NO) on the first occasion, the program proceeds to a step S17, where a θIGVTM map is retrieved to obtain the aforementioned map value θIGVTM.

Figure 5B:
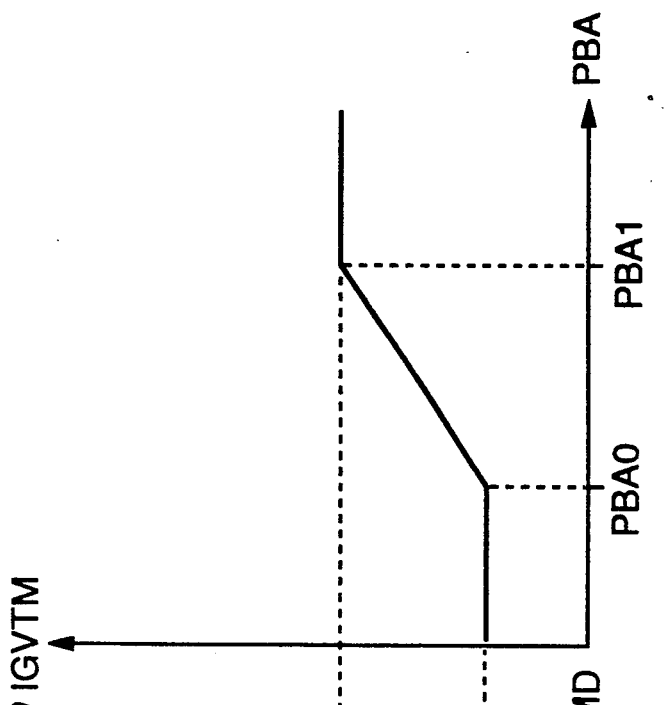
FIG. 5B shows another part of the $\theta$IGVTM map.
Figure 5A:
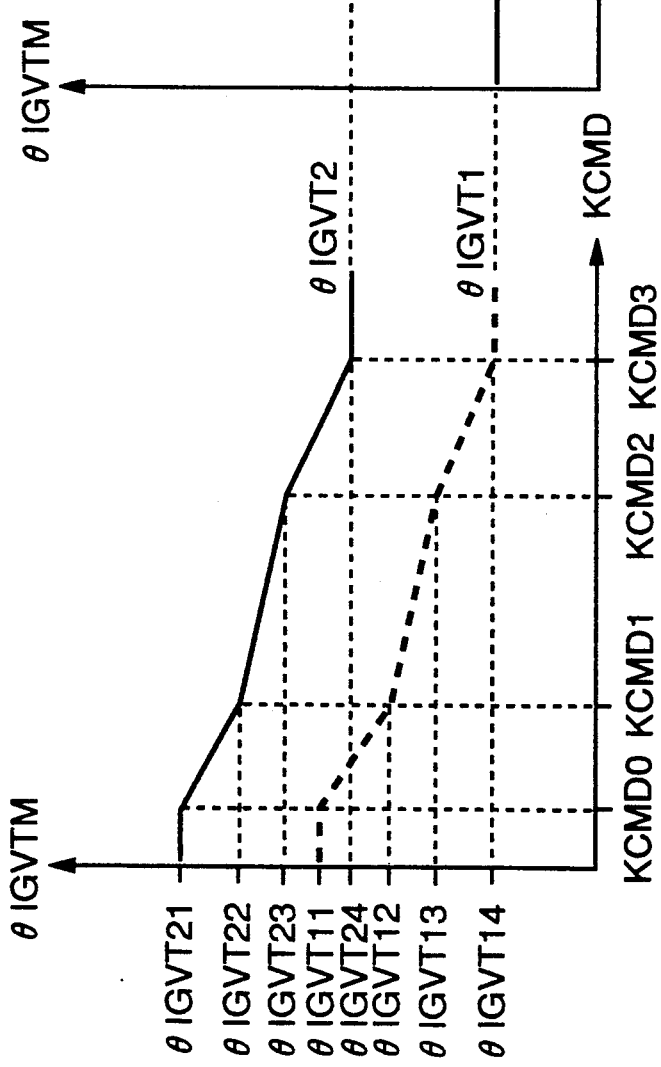
FIG. 5A shows part of a $\theta$IGVTM map.

As shown in FIG. 5, the θIGVTM map comprises a characteristic curve θIGVT1 (indicated by the broken line in FIG. 5A) to be applied when the intake pipe absolute pressure PBA is below a predetermined value PBA0, and a characteristic curve θIGVT2 (indicated by the solid line in FIG. 5B) to be applied when the intake pipe absolute pressure PBA is above a predetermined value PBA1. As shown in FIG. 5A, predetermined values θIGVT11 to θIGVT14 and θIGVT21 to θIGVT24 are set corresponding respectively to predetermined values KCMD0 to KCMD3 of the desired air-fuel ratio coefficient KCMD. Accordingly, at the step S17, if a condition of PBA ≧ PBA1 or PBA ≦ PBA0 is satisfied, a value on the characteristic curve θIGVT2 or θIGVT1 is read from the θIGVTM map of FIG. 5A according to the desired air-fuel ratio coefficient KCMD (θIGVTM values corresponding to values other than the predetermined set values KCMD0 to KCMD3 are obtained by interpolation according to the desired air-fuel ratio coefficient), whereas if a condition of PBA0 < PBA < PBA1 is satisfied, values on the characteristic curves θIGVT2 and θIGVT1 are read in a similar manner from the map of FIG. 5A and the read values are subjected to interpolation according to the intake pipe absolute pressure PBA to calculate a θIGVTM value.

At a step S18, the θIGVTM value read at the step S17 is stored as the V/T changeover correction value θIGVT into the memory means 5c, and then the count value of the first counter CnVT is decreased by a decremental value of 1 at a step S19, followed by terminating the subroutine.

If the answer to the question of the step S16 becomes affirmative (YES) in a subsequent loop, the program proceeds to a step S20, where it is determined whether or not a value obtained by subtracting a predetermined minute value ΔIGVT (e.g. 2°) from the correction value θIGVT is smaller than "0". If the answer to this question is affirmative (YES), the value obtained by subtraction is set to a new value of the correction value θIGVT at a step S21, followed by terminating the subroutine. If the answer to the question of the step S20 becomes negative (NO) in a subsequent loop, the program proceeds to the step S14, where the correction value is set to 0, followed by terminating the subroutine. In short, after the lapse of the predetermined time period for using the map value $\theta$IGVTM, the correction value $\theta$IGVT initially set to the map value $\theta$IGVTM is progressively reduced to "0".

Upon terminating this subroutine, the result of the calculation is stored into the memory means 5c, and then the program returns to the main routine shown in FIG. 2.

Figure 6:
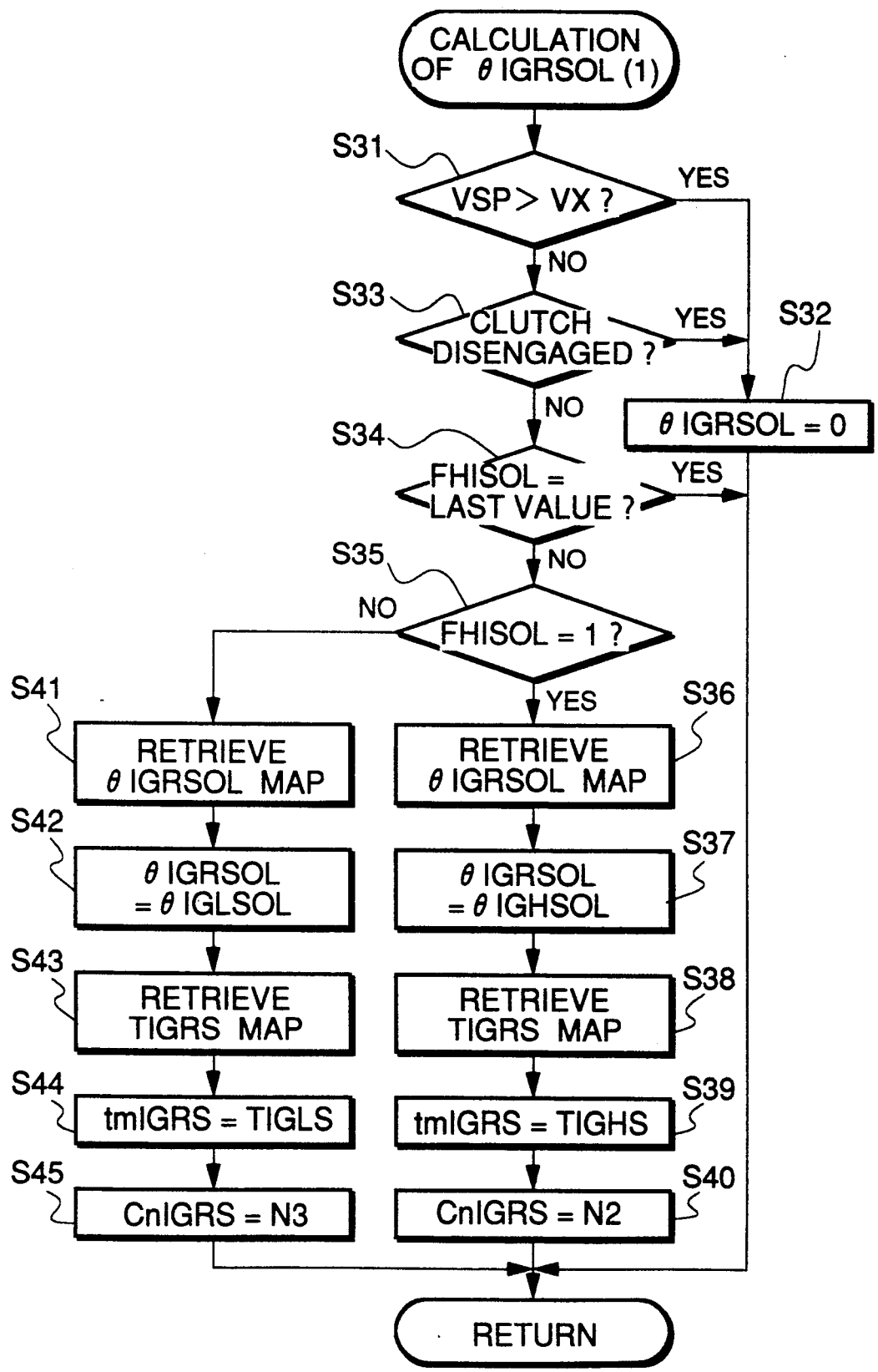
FIG. 6 is a flowchart showing a first subroutine for calculating a reduction ratio changeover-dependent correction value $\theta$IGRSOL.

FIG. 6 shows a first subroutine for calculating the shift correction value $\theta$IGRSOL, which is executed whenever a signal pulse is generated by a timer incorporated in the ECU 5 at intervals of 20 millisec. Results of this subroutine, i.e. a value of the shift correction value $\theta$IGRSOL, a predetermined value set to a delay timer tmIGRS, referred to hereinafter, a predetermined count value set to a counter CnIGRS, referred to hereinafter, calculated by this routine are used in a second subroutine for calculating the shift correction value $\theta$IGRSOL, described in detail hereinafter, when it is executed as the step S5 of the main routine of FIG. 2 for finally determining a value of the shift correction value $\theta$IGRSOL to be used in comparison at the step S7 of the main routine.

First, at a step S31, it is determined whether or not the vehicle speed VSP detected by the VSP sensor 15 is higher than a predetermined value (e.g. 90 km/h). If the answer to this question is affirmative (YES), it is judged that the vehicle speed is high, and the shift correction value $\theta$IGRSOL is set to "0" at a step S32, followed by terminating the subroutine.

On the other hand, if the answer to the question of the step S31 is affirmative (YES), the program proceeds to a step S33, where a clutch, not shown, of the vehicle is disengaged. If the answer to this question is affirmative (YES), the program proceeds to the step S32.

If the answer to the question of the step S33 is negative (NO), the program proceeds to a step S34, where it is determined whether or not a flag FHISOL, which is set by another routine, has the same value as in the immediately preceding loop. The flag FHISO is set to "1" when the reduction ratio of the transmission 14 is decreased. If the answer to the question of the step S34 is affirmative (YES), it is judged that the reduction ratio of the transmission 14 has not been changed, and the subroutine is immediately terminated.

On the other hand, if the answer to the question of the step S34 is negative (NO), the program proceeds to a step S35, where it is determined whether or not the flag FHISOL is equal to "1". If the answer to this question is affirmative (YES), which means that the reduction ratio of the transmission 14 has been decreased, i.e. the gear position of the same has been changed to a higher speed position (shift position), the program proceeds to a step S36, where a $\theta$IGRSOL map is retrieved to obtain a map value $\theta$IGHSOL, and the map value $\theta$IGHSOL is stored into the memory means 5c as the shift correction value $\theta$IGRSOL at a step S37. Then, at a step S38, a TIGRS map is retrieved to obtain a delaying time period TIGHS to be set to a second delay timer tmIGRS for compensating for a control time lag due to the use of hydraulic pressure. Then, the second delay timer tmIGRS is set to the delaying time period TIGHS at a step S39, and a second counter CnIGRS is set to a predetermined value N2 (e.g. 4) for holing the map value at a step S40, followed by terminating the subroutine.

On the other hand, if the answer to the step S35 is negative (NO), i.e. if the flag FHISOL has changed from "1" (the immediately preceding value) to "0", which means that the reduction ratio of the transmission 14 has been increased, the program proceeds to a step S41, where the $\theta$IGRSOL map is retrieved to obtain a map value $\theta$IGLSOL, and the map value $\theta$IGLSOL is stored into the memory means 5c as the shift correction value $\theta$IGRSOL at a step S42. Then, at a step S43, the TIGRS map is retrieved to obtain a delaying time period TIGLS to be set to the second delay timer tmIGRS for compensating for a control time lag due to the use of hydraulic pressure.

Then, the second delay timer tmIGRS is set to the delaying time period TIGLS at a step S44, and the second counter CnIGRS is set to a predetermined value N3 (e.g. 8) for holding the map value at a step S45, followed by terminating the subroutine. In this connection, when the reduction ratio of the transmission 14 is increased, the output torque of the engine is affected thereby for a longer time period than when the reduction ratio of the transmission 14 is decreased. Therefore, the predetermined time period N3 is set to a larger value (e.g. 8) than the predetermined time period N2 (e.g. 4) set at the step S40.

Figure 7:
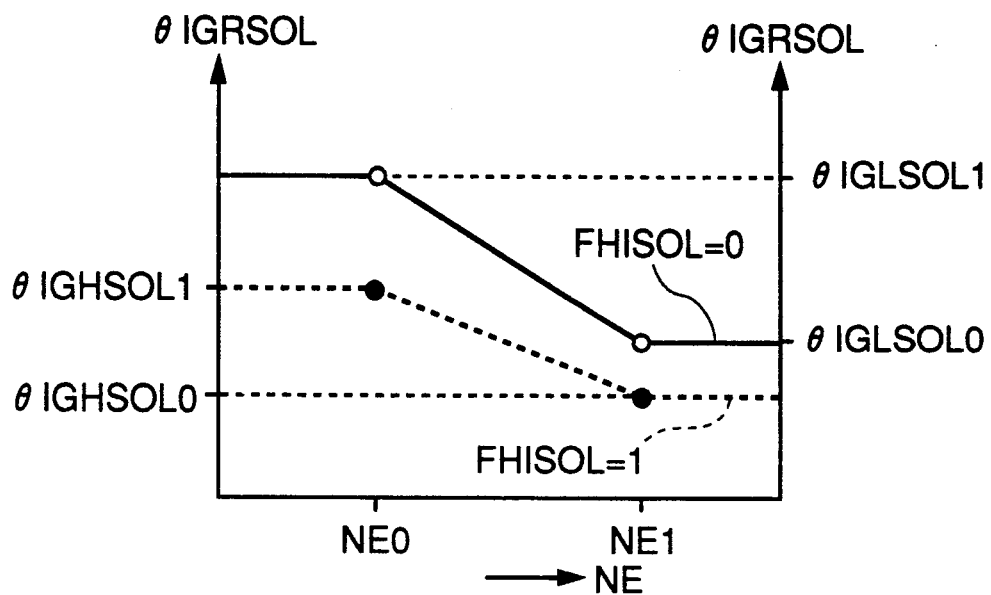
FIG. 7 shows a $\theta$IGRSOL map.

FIG. 7 shows the $\theta$IGRSOL map which is retrieved at the step S36 or S41. This map is set such that predetermined values $\theta$IGHSOL0, $\theta$IGHSOL1 of the shift correction value $\theta$IGRSOL suitable for changeover of the transmission to a higher speed position (i.e. FHISOL=1) and predetermined values $\theta$IGLSOL0, $\theta$IGLSOL1 of the shift correction value $\theta$IGRSOL suitable for changeover of the transmission to a lower speed position (i.e. FHISOL=0) are provided correspondingly to predetermined values NE0, NE1 of the engine rotational speed NE, for each of values of the reduction ratio of the transmission 14 (corresponding to the second speed position (the second shift position) to the seventh speed position (the seventh shift position)). The above-mentioned map value $\theta$IGHSOL or $\theta$IGLSOL is obtained by retrieving the $\theta$IGRSOL map, or additionally by interpolation. In this connection, as is clear from FIG. 7, the map value $\theta$IGHSOL or $\theta$IGLSOL assumes a smaller value as the engine rotational speed NE increases.

Figure 8:
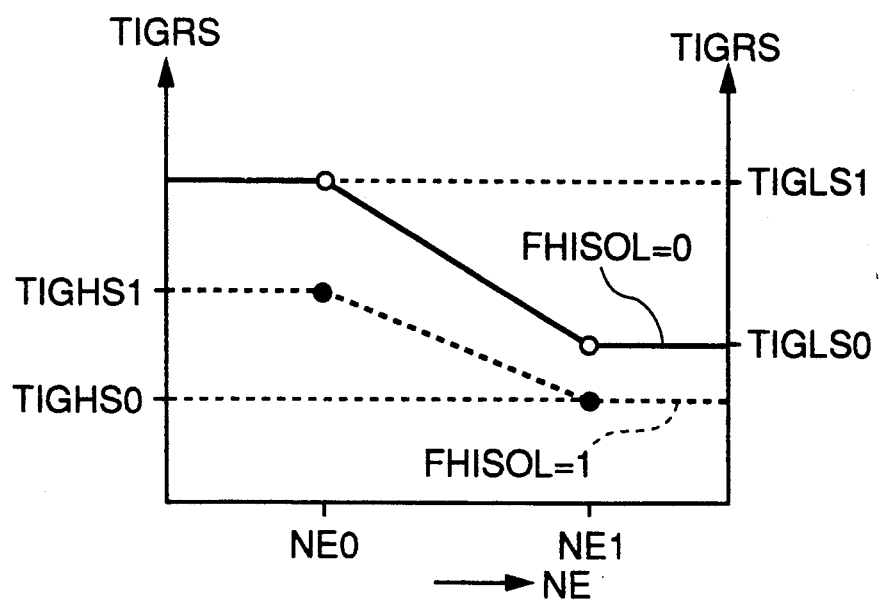
FIG. 8 shows a TIGRS map.

FIG. 8 shows the TIGRS map retrieved at the step S39 or S44. This map is set such that predetermined values TIGHS0, TIGHS1 of the delaying time period TIGRS suitable for changeover of the transmission to a higher speed position (i.e. FHISOL=1) and predetermined values TIGLS0, TIGLS1 of the delaying time period TIGRS suitable for changeover of the transmission to a lower speed position (i.e. FHISOL=0) are provided correspondingly to predetermined values NE0, NE1 of the engine rotational speed NE. The above-mentioned map value TIGHS or TIGLS is obtained by retrieving the TIGRS map, or additionally by interpolation. In this connection, as is clear from FIG. 8, the predetermined value TIGRS assumes a smaller value as the engine rotational speed NE increases.

Figure 9:
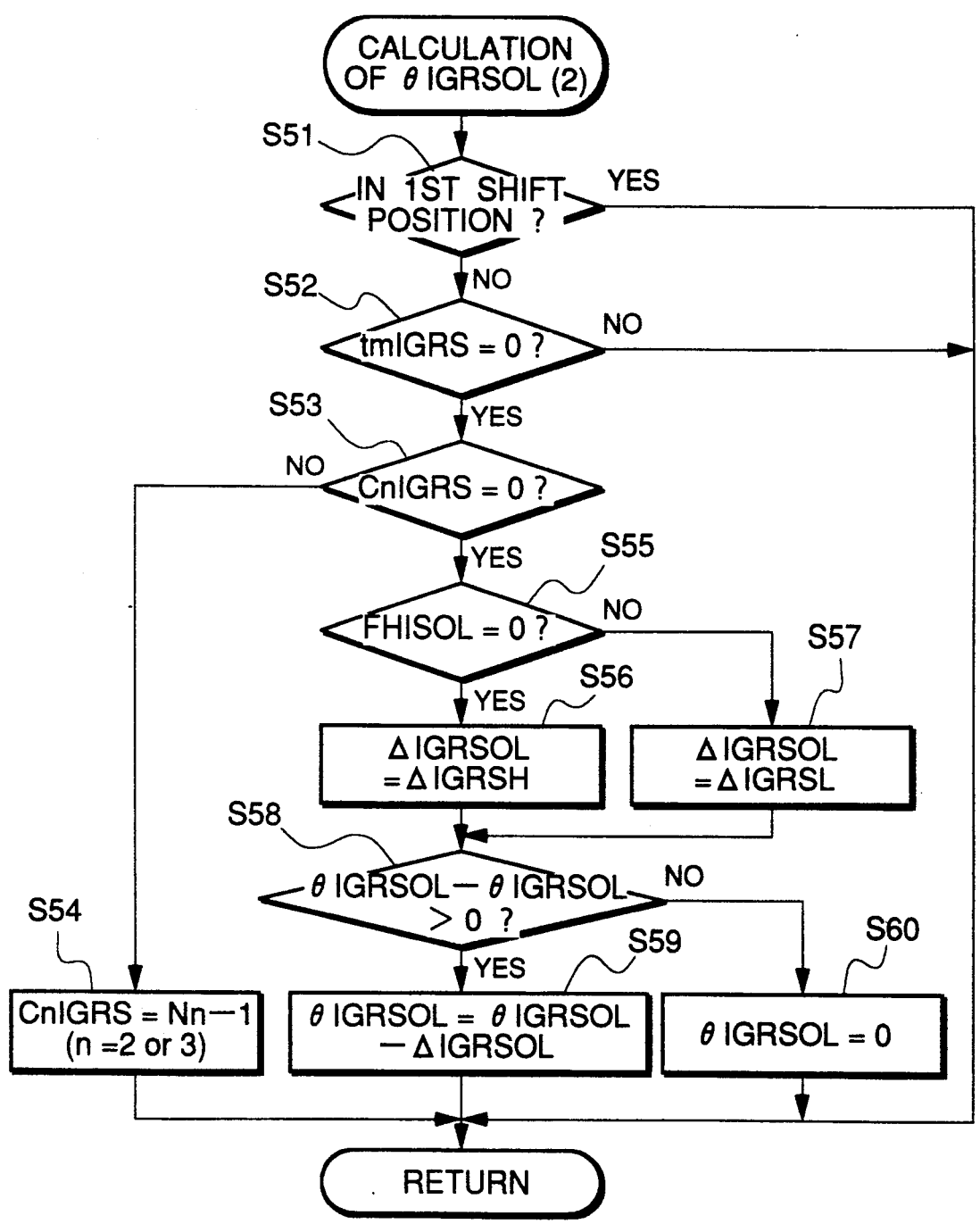
FIG. 9 is a flowchart showing a second subroutine for calculating the reduction ratio changeover-dependent correction value $\theta$IGRSOL.

FIG. 9 shows the aforementioned second subroutine for calculating the shift correction value $\theta$IGRSOL in response to a change in the reduction ratio of the transmission 14, which is executed in synchronism with inputting of TDC signal pulses to the ECU 5, i.e. at the step S5 of the main routine of FIG. 2. This routine is executed using the results of calculation effected by the subroutine of FIG. 6, and if a new value of the shift correction value θIGRSOL is not calculated, a value thereof calculated and stored in the first routine described above is stored as a final value thereof.

Referring to FIG. 9, at a step S51, it is determined whether or not the transmission 14 is in the first speed position (the first shift position). If the answer to this question is affirmative (YES), the present subroutine is immediately terminated, and the program returns to the main routine of FIG. 2. If the answer to this question is negative (NO), i.e. if the transmission 14 is in the second speed or higher speed position, the program proceeds to a step S52, where it is determined whether or not the second delay timer tmIGRS, which has been set to the delaying time period TIGHS at the step S39 or to the delaying time period TIGLS at the step S44, has counted up, i.e. the count value of the timer tmIGRS is equal to "0".

If the answer to this question is negative (NO), the subroutine is immediately terminated, and the program returns to the main routine of FIG. 2. On the other hand, if the answer to this question is affirmative (YES), the program proceeds to a step S53, where it is determined whether or not the count value of the second counter CnIGRS is equal to "0".

On the first occasion, the answer to the question of the step S53 should be negative (NO), i.e. the count value of the second counter CnIGRS should not be equal to "0", the shift correction value θIGRSOL is held at the value obtained at the step S37 or S42, i.e. no change is made to the map value θIGHSOL or θIGLSOL to which the shift correction value θIGRSOL has been set at the step S37 or S42, and the program proceeds to a step S54, where the count value of the second counter CnIGRS is decreased by a decremental value of 1, followed by terminating the subroutine, and the program returning to the main routine of FIG. 2.

On the other hand, if the answer to the question of the step S53 becomes affirmative in a subsequent loop, the program proceeds to a step S55, where it is determined whether or not the aforementioned flag FHISOL is equal to "1".

If the answer to this question is affirmative (YES), a subtracting minute value ΔIGRSOL is set to a predetermined value ΔIGRSH (e.g. 0.7°) suitable for changeover of the transmission 14 to a higher speed position at a step S56, and then the program proceeds to a step S58. On the other hand, if the answer to the question of the step 55 is negative (NO), the subtracting minute value ΔIGRSOL is set to a predetermined value ΔIGRSL (e.g. 1.4°) suitable for changeover of the transmission 14 to a lower speed position at a step S57, followed by the program proceeding to the step S58.

At the step S58, it is determined whether or not a value obtained by subtracting the subtracting minute value ΔIGRSOL from the shift correction value θIGRSOL, which is, on the first occasion, equal to the map value θIGHSOL obtained at the step S36 or θIGLSOL obtained at the step S41, is larger than 0. If the answer to this question is affirmative (YES), the resulting value, which has been decreased by the minute value ΔIGRSOL, is set to a renewed value of the shift correction value θIGRSOL, followed by terminating the subroutine, and the program returning to the main routine of FIG. 2. On the other hand, if the answer to the question of the step S58 becomes negative (NO) in a subsequent loop, the program proceeds to a step S60, where the shift correction value θIGRSOL is set to "0", followed by terminating the subroutine, and the program returning to the main routine of FIG. 2.

Next, a manner of calculation of the acceleration correction value θIGAR for retarding the ignition timing upon changeover of the operative state of the engine to an accelerating condition, which is executed at the step S6 in the main routine of FIG. 2, will be described in detail.

Figure 10:
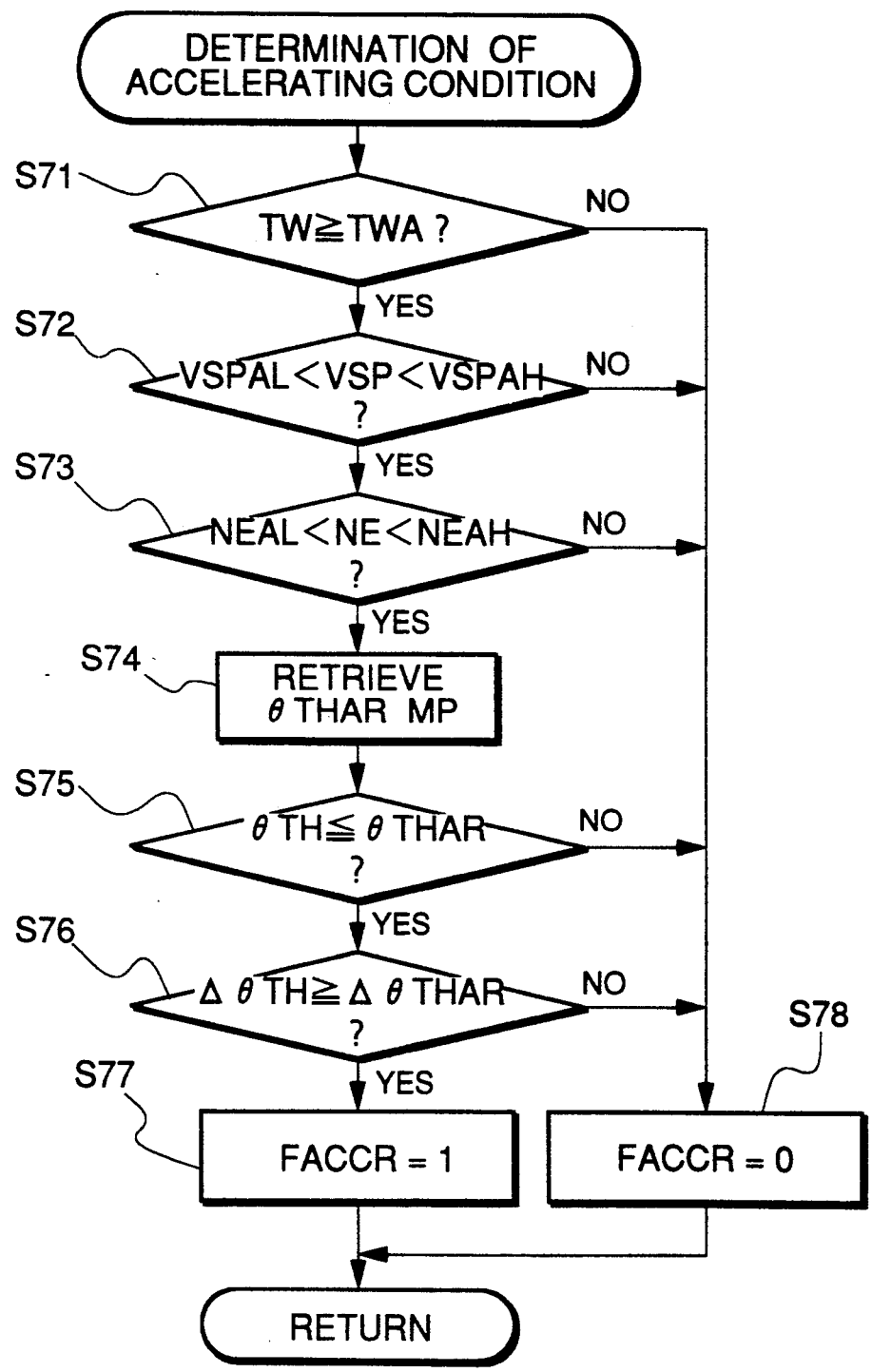
FIG. 10 is a flowchart showing a subroutine for determining whether or not the engine is in a predetermined accelerating condition.

FIG. 10 shows a subroutine for determining whether or not the engine is in a predetermined accelerating condition.

First, at a step S71, it is determined whether or not the engine coolant temperature TW is equal to or higher than a predetermined lower limit value TWA (e.g. 53° C.), i.e. a condition of TW≧TWA is satisfied.

If the answer to this question is affirmative (YES), it is determined at a step S72 whether or not the vehicle speed VSP falls within a predetermined range defined by a lower limit value VSPAL and a higher limit value VSPAH, i.e. a condition of VSPAL<VSP<VSPAH (e.g. 7 km/h<80 km/h) is satisfied. If the answer to this question is affirmative (YES), it is determined at a step S73 whether or not the engine rotational speed NE falls within a predetermined range defined by a lower limit value NEAL and a higher limit value NEAH, i.e. a condition of NEAL<NE<NEAH (e.g. 700 rpm<NE<3000 rpm) is satisfied.

If the answer to this question is affirmative (YES), the program proceeds to a step S74, where a θTHAR map is retrieved to determine a reference higher limit value θTHAR of opening θTH of the throttle valve 3' for determining whether or not the engine is in the predetermined accelerating condition.

Figure 11:
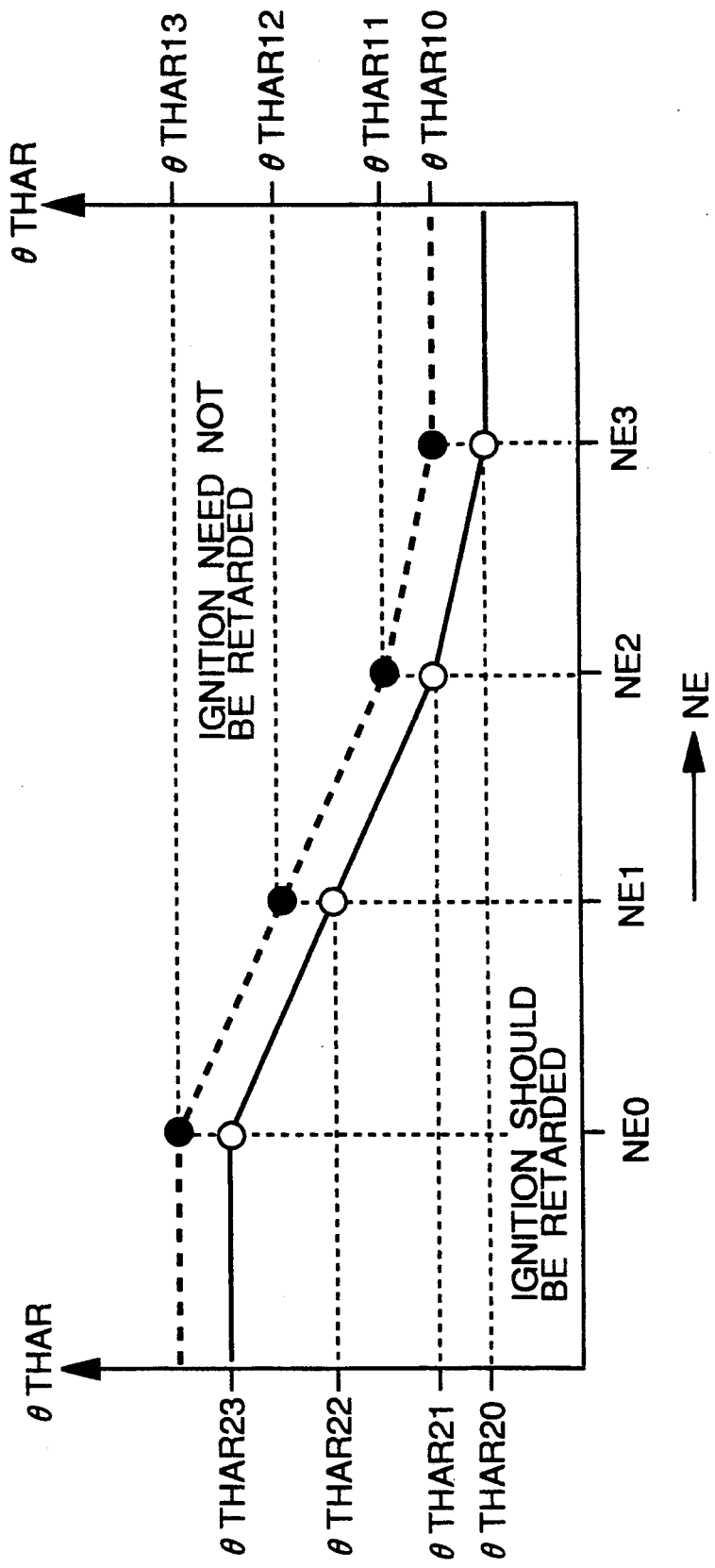
FIG. 11 shows a $\theta$THAR map.

The θTHAR map is set, e.g. as shown in FIG. 11, such that values θTHAR10 to θTHAR13 of the reference higher limit value θTHAR suitable for the high speed V/T and values θTHAR20 to θTHAR23 of the reference higher limit value θTHAR suitable for the low speed V/T are provided correspondingly to predetermined values NE0 to NE 3 of the engine rotational speed NE. The reference higher limit value θTHAR of the throttle valve opening θTH is determined by retrieving this map or additionally by interpolation.

Then, at a step S75, it is determined whether or not the throttle valve opening θTH detected in the present loop is equal to or smaller than the reference higher limit value θTHAR obtained at the step S74, i.e. a condition of θTH≦θTHAR is satisfied. If the answer to this question is affirmative (YES), it is judged that the engine can be drastically accelerated, and then the program proceeds to a step S76, where it is determined whether or not the difference ΔθTH between the present value and the immediately preceding value of the throttle valve opening θTH is equal to or larger than a predetermined value ΔθTHAR (e.g. 15.0°), i.e. a condition of ΔθTH≧ΔθTHAR is satisfied. If the answer to this question is affirmative (YES), it is judged that the engine is being drastically accelerated, i.e. in the predetermined accelerating condition, and then a flag FACCR for indicating the predetermined accelerating condition of the engine is set to "1" at a step S77, followed by terminating the subroutine.

On the other hand, if any of the answers to the questions of the steps S71, S72, S73, S75, and S76 is negative (NO), it is judged that the engine is not in the predetermined accelerating condition, so that the program proceeds to a step S78, where the flag FACCR is set to "0", followed by terminating the subroutine.

Figure 12:
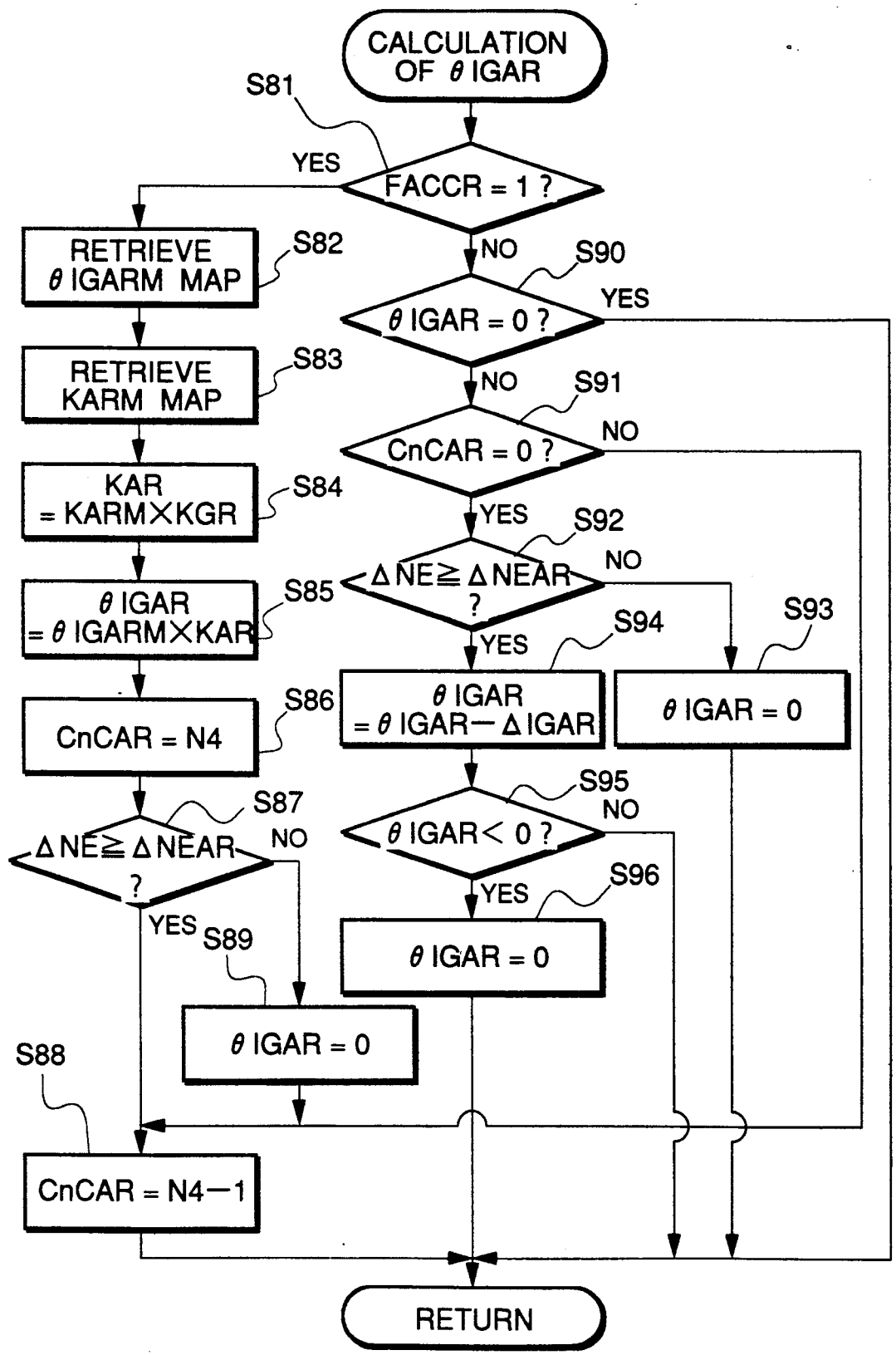
FIG. 12 is a flowchart showing a subroutine for calculating an acceleration-dependent correction value $\theta$IGAR.

FIG. 12 shows a subroutine for calculating the acceleration correction value $\theta$IGAR.

First, at a step S81, it is determined whether or not the flag FACCR set in the FIG. 10 subroutine is equal to "1", i.e. the engine is in the predetermined accelerating condition in which the ignition timing should be retarded.

If the answer to this question is affirmative (YES), a $\theta$IGARM map is retrieved at a step S82 to obtain a basic acceleration correction value $\theta$IGARM.

Figure 13:
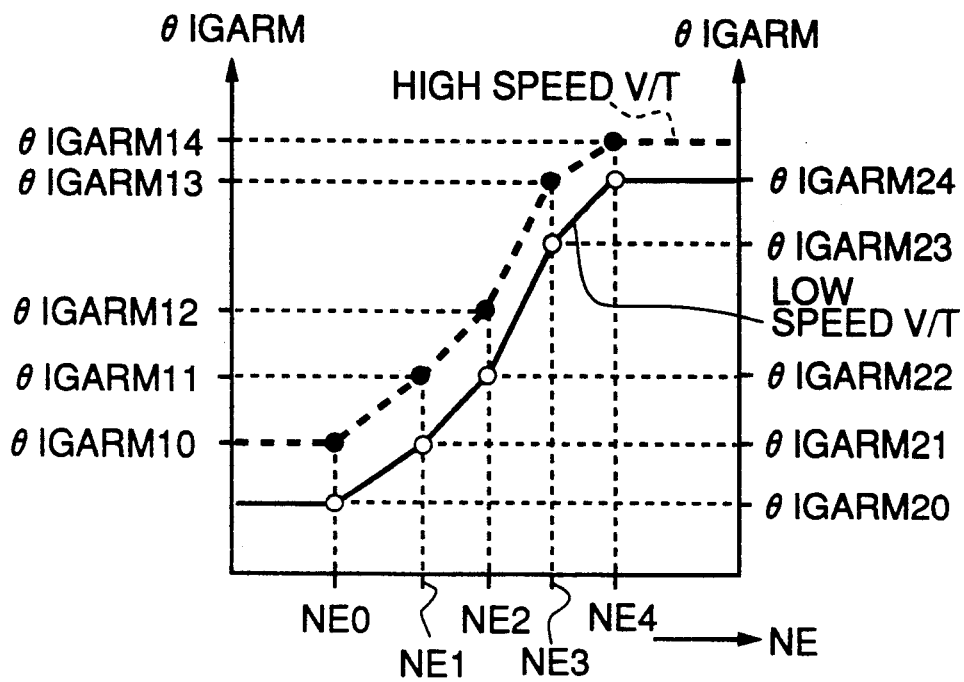
FIG. 13 shows a $\theta$IGARM map.

The $\theta$IGARM map is set, e.g. as shown in FIG. 13, such that values $\theta$IGARM10 to $\theta$IGARM14 of the basic acceleration correction value $\theta$IGARM suitable for the high speed V/T and values $\theta$IGARM20 to $\theta$IGARM24 of the basic acceleration correction value $\theta$IGARM suitable for the low speed V/T are provided correspondingly to predetermined values NE0 to NE4 of the engine rotational speed NE. The basic acceleration correction value $\theta$IGARM is determined by retrieving this map or additionally by interpolation. As is clear from FIG. 13, the basic acceleration correction value $\theta$IGARM is set to a larger value as the engine rotational speed NE increases.

Then, the program proceeds to a step S83, where a KARM map is retrieved to determine a basic correction coefficient KARM used for correcting the basic acceleration correction value $\theta$IGARM.

Figure 14:
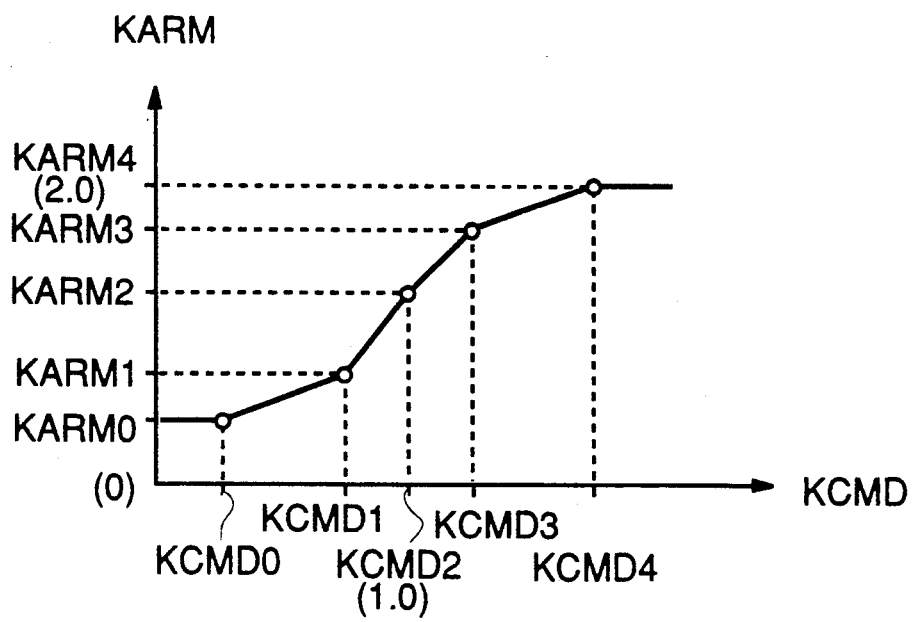
FIG. 14 shows a KARM map.

The KARM map is set, e.g. as shown in FIG. 14, such that predetermined values KARM0 to KARM4 of the basic correction coefficient KARM are provided correspondingly to predetermined values KCMD0 to KCMD4 of the desired air-fuel ratio coefficient KCMD. The basic correction coefficient KARM is determined by retrieving this map or additionally by interpolation.

Then, the program proceeds to a step S84, where a correction coefficient KAR is calculated by the use of the following equation (3):

$$KAR = KARM \times KGR \quad (3)$$

where KGR represents a predetermined value set according to the reduction ratio of the transmission 14, i.e. the gear position of same (e.g. it assumes a value of 1.5 when the transmission is in the first speed position (the first shift position), a value of 1.0 when it is in the second speed position (the second shift position), a value of 0.75 when it is in the third speed position (the third shift position), a value of 0.5 when it is in the fourth speed position (the fourth shift position), etc.)

Then, the program proceeds to a step S85, where the acceleration correction value $\theta$IGAR is calculated by the use of the following equation (4):

$$\theta IGAR = \theta IGARM \times KAR \quad (4).$$

At the following step S86, a third counter CnCAR is set to a predetermined value N4, followed by the program proceeding to a step S87. The predetermined value N4 is set to a suitable value according to the valve timing in use, e.g. to 4 when the high speed V/T is in use, and to 8 when the low speed V/T is in use.

At the step S87, it is determined whether or not the difference $\Delta$NE between the present value and the immediately preceding value of the engine rotational speed NE is equal to or larger than a predetermined value $\Delta$NEAR (e.g. 4 rpm), i.e. a condition of $\Delta$NE $\geq$ $\Delta$NEAR is satisfied. If the answer to this question is affirmative (YES), the third counter CnCAR is decreased by a decremental value of 1 at a step S88, followed by terminating the subroutine and the program returning to the main routine of FIG. 2. On the other hand, if the answer to the question is negative (NO), it is judged that a torque shock caused by a change in the engine rotational speed NE is slight in magnitude, so that the acceleration correction value $\theta$IGAR is set to "0" at a step S89, and the program proceeds to the step S88, followed by terminating the subroutine.

If the engine ceases to be in the predetermined accelerating condition in a subsequent loop, the flag FACCR is set to "0" by the FIG. 10 subroutine, so that the answer to the question of the step S81 becomes negative (NO), and the program proceeds to a step S90, where it is determined whether or not the acceleration correction value $\theta$IGAR is equal to "0". If the acceleration correction value $\theta$IGAR has been set to "0" at the step S89, the answer to this question is affirmative (YES), and then the subroutine is immediately terminated and the program returns to the main routine of FIG. 2. On the other hand, if the answer to the question of the step S90 is negative (NO), it is determined at a step S91 whether or not the third counter CnCAR has counted up, i.e. the count value thereof is equal to "0". If the answer to this question is negative (NO), the program proceeds to the step S88 to decrease the count value of the third counter CnCAR by a decremental value of 1, whereas if the answer is affirmative (YES), it is determined at a step S92, similarly to the step S87, whether or not the difference $\Delta$NE between the present value and the immediately preceding value of the engine rotational speed NE is equal to or larger than the predetermined value $\Delta$NEAR (e.g. 4 rpm), i.e. the condition of $\Delta$NE $\geq$ $\Delta$NEAR is satisfied.

If the answer to this question is negative (NO), i.e. if a change in the engine rotational speed NE is then small, the acceleration correction value $\theta$IGAR is set to "0", followed by terminating the subroutine and the program returning to the main routine of FIG. 2.

On the other hand, if the answer to the question of the step S92 is affirmative (YES), the program proceeds to a step S94, where a predetermined minute value $\Delta$IGAR (e.g. 2°) is subtracted from the acceleration correction value $\theta$IGAR (e.g. 13°), and at the following step S95, it is determined whether or not the resulting or renewed value of the acceleration correction value $\theta$IGAR is smaller than 0. If the answer to this question is negative (NO), the subroutine is terminated and the program returns to the main routine of FIG. 2, whereas if the answer is affirmative (YES), the acceleration correction value $\theta$IGAR is set to "0" at a step S96, followed by terminating the subroutine and the program returning to the main routine of FIG. 2. Thus, the acceleration correction value $\theta$IGAR is progressively decreased to "0" after being held for the predetermined time period.

As described hereinbefore, the largest one of the V/T changeover correction value $\theta$IGVT, the shift correction value $\theta$IGRSOL, and the acceleration correction value $\theta$IGAR, is selected and set to the final ignition timing-retarding correction value $\theta$IGR. The timing advance value $\theta$IGA is calculated by the use of the equation (2) and the ignition timing is controlled thereby (see the steps S7 to S9 in FIG. 2). In short, the ignition timing advance value is set to a value obtained by subtracting the final ignition timing-retarding correction value θIGR from the value (θIGM×KIG), and held at the value for the predetermine time period, upon the lapse of which the ignition timing advance value is progressively returned to the value (θIGM×KIG). Thus, it is possible to avoid a torque shock, which would otherwise occur when the engine is in a transient state, i.e. the operative state of the engine is changed over, and also when the engine returns to an ordinary operative state.

Figure 15:
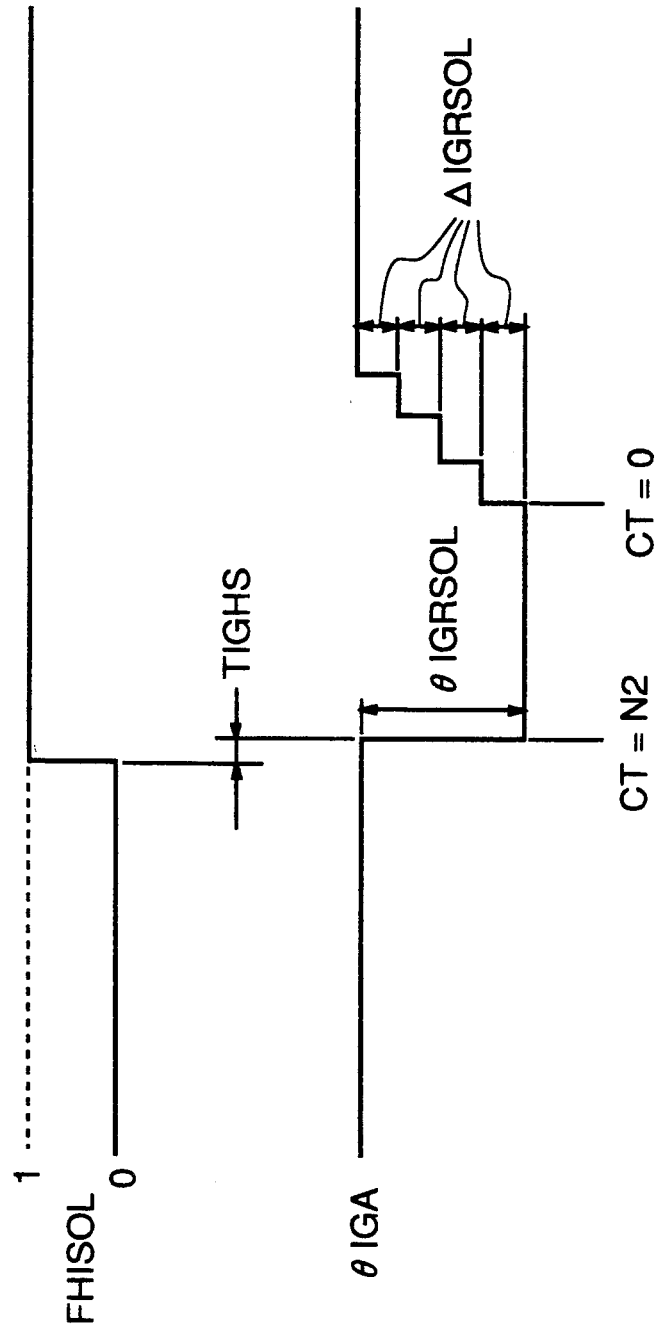
FIG. 15 is a timing chart showing an example of changes in the ignition timing (ignition timing advance value) performed by the ignition timing control system.

FIG. 15 shows an example of changes in the ignition timing advance value effected by the ignition timing control system of the invention when the operative state of the engine is changed over, i.e. in this example, when the transmission 14 is changed from a lower speed position to a higher speed position.

Specifically, when the transmission 14 is changed from the lower speed position to the higher speed position (i.e. the flag FHISOL is changed from "0" to "1"), the ignition timing advance value θIGA is set to a value reduced by the shift correction value θIGRSOL after the lapse of the predetermined delaying time period TIGHS. The ignition timing advance value is set to and held at the value for a time period corresponding to occurrence of the predetermined number N2 of TDC signal pulses. When the count value of the second counter CnIGRS is reduced to "0", the ignition timing advance value θIGA is progressively returned to a non-modified value by progressively reducing the shift correction value θIGRSOL by the decremental minute value ΔIGRSOL, to thereby restore normal ignition timing. By this control, it is possible to avoid a torque shock due to a large change in the ignition timing advance value which would otherwise be effected when the engine is in a stable high speed condition after the lapse of the predetermined time period.

In addition, although illustration is omitted, it goes without saying that also the V/T changeover correction value θIGVT, the shift correction value θIGRSOL obtained in the case of changeover of the transmission from a higher speed position to a lower speed position, and the acceleration correction value θIGAR, will show similar changes, as can be presumed from the aforedescribed subroutines shown in FIG. 3, FIG. 9, and FIG. 11.

What is claimed is:

1. An ignition timing control system for an internal combustion engine having spark plugs, said system controlling ignition timing of said spark plugs, and a plurality of changeover devices, changeover of an operative state of each of said changeover devices having influence upon output torque of said engine,
the system comprising:
operating condition-detecting means for detecting operating conditions of said engine;
ignition timing advance value-calculating means for calculating a basic ignition timing advance value based on results of detection by said operating condition-detecting means;
changeover-detecting means for detecting a changeover of the operative state of each of said changeover devices;
correction value-calculating means for calculating a correction value for correcting said basic ignition timing advance value for suppressing said engine torque, in response to results of detection of said changeover of the operative state of said each of said changeover devices by said changeover detecting means; and
correction value-selecting means for selecting the largest one of a plurality of said correction values calculated by said correction value-calculating means to a final correction value to be used for correcting said basic ignition timing advance value, when said changeover-detecting means has detected changeovers of the operative states of at least two of said changeover devices substantially at the same time.

2. An ignition timing control system according to claim 1, wherein said operating conditions of said engine include at least load on said engine and a rotational speed of said engine.

3. An ignition timing control system according to claim 1, wherein said engine includes intake valves, said changeover devices including valve timing-changing means for changing a manner of opening said intake valves, and a transmission being capable of changing a reduction ratio thereof to a plurality of ratios, said changeover-detecting means including first changeover-detecting means for detecting a changeover of an operative state of said valve timing-changing means, and second changeover-detecting means for detecting a changeover of the reduction ratio of said transmission, said correction value-correcting means including first correction value-calculating means for calculating a first correction value for correcting said basic ignition timing advance value in response to results of detection by said first changeover-detecting means, and second correction value-calculating means for calculating a second correction value for correcting said basic ignition timing advance value in response to results of detection by said second changeover-detecting means, said correction value-selecting means selecting the largest one of said first and second correction values calculated by said first and second correction value-calculating means to said final correction value to be used for correcting said basic ignition timing advance value, when said first and second changeover-detecting means have detected changeovers of the operative states of said valve timing-changing means and said transmission substantially at the same time.

4. An ignition timing control system according to claim 3, wherein said changeover-detecting means includes third changeover-detecting means for detecting a changeover of an operative state of said engine to a predetermined accelerating condition, said correction value-correcting means including third correction value-calculating means for calculating a third correction value for correcting said basic ignition timing advance value in response to results of detection by said third changeover-detecting means, said correction value-selecting means selecting the largest one of said first to third correction values calculated by said first to third correction value-calculating means to said final correction value to be used for correcting said basic ignition timing advance value, when at lewast two of said first to third changeover-detecting means have detected changeovers of the operative states of corresponding ones of said valve timing-changing means, said transmission and said engine substantially at the same time.

5. An ignition timing control system according to claim 3 or 4, wherein said operating condition-detecting means includes coolant temperature-detecting means for detecting a temperature of a coolant circulating through said engine, said calculation of said first correction value by said first correction value-calculating means being effected upon the lapse of a first predetermined time period after said first changeover-detecting means has detected a changeover of the operative state of said valve timing-changing means, said first predetermined time period being set based upon the temperature of said coolant detected by said coolant temperature-detecting means.

6. An ignition timing control system according to claim 3 or 4, wherein said operating condition-detecting means includes engine rotational speed-detecting means for detecting the rotational speed of said engine, said calculation of said second correction value by said second correction value-calculating means being effected upon the lapse of a second predetermined time period after said second changeover-detecting means has detected a changeover of the reduction ratio of said transmission, said second predetermined time period being set based upon the rotational speed of said engine and the manner of changeover in the reduction ratio of said transmission detected by said second changeover-detecting means.

7. An ignition timing control system according to claim 5, wherein said operating condition-detecting means includes engine rotational speed-detecting means for detecting the rotational speed of said engine, said calculation of said second correction value by said second correction value-calculating means being effected upon the lapse of a second predetermined time period after said second changeover-detecting means has detected a changeover of the reduction ratio of said transmission, said second predetermined time period being set based upon the rotational speed of said engine and the manner of changeover in the reduction ratio of said transmission detected by said second changeover-detecting means.

8. An ignition timing control system engine according to claim 3 or 4, wherein said operating condition-detecting means includes engine load detecting means for detecting load on said engine, said first correction value-calculating means calculating said first correction value based upon the load on said engine detected by said operating condition-detecting means.

9. An ignition timing control system engine according to claim 5, wherein said operating condition-detecting means includes engine load detecting means for detecting load on said engine, said first correction value-calculating means calculating said first correction value based upon the load on said engine detected by said operating condition-detecting means.

10. An ignition timing control system engine according to claim 6, wherein said operating condition-detecting means includes engine load detecting means for detecting load on said engine, said first correction value-calculating means calculating said first correction value based upon the load on said engine detected by said operating condition-detecting means.

11. An ignition timing control system engine according to claim 7, wherein said operating condition-detecting means includes engine load detecting means for detecting load on said engine, said first correction value-calculating means calculating said first correction value based upon the load on said engine detected by said operating condition-detecting means.

12. An ignition timing control system according to claim 3 or 4, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

13. An ignition timing control system according to claim 5, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

14. An ignition timing control system according to claim 6, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

15. An ignition timing control system according to claim 7, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

16. An ignition timing control system according to claim 8, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

17. An ignition timing control system according to claim 9, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

18. An ignition timing control system according to claim 10, wherein said operating condition-detecting means includes engine rotational speed-detecting means for detecting the rotational speed of said engine, said second correction value-correcting means calculating said second correction value based upon said rotational speed of said engine detected by said operating condition-detecting means and a manner of changeover of the reduction ratio of said transmission detected by said second changeover-detecting means.

19. An ignition timing control system according to claim 11, wherein said operating condition-detecting means includes engine rotational speed-detecting means for detecting the rotational speed of said engine, said second correction value-correcting means calculating said second correction value based upon said rotational speed of said engine detected by said operating condi-tion-detecting means and a manner of changeover of the reduction ratio of said transmission detected by said second changeover-detecting means.

* * * * *